C. W. McWANE.
BOLTLESS MOLDBOARD AND LANDSIDE PLOW.
APPLICATION FILED JUNE 5, 1912.

1,076,507.

Patented Oct. 21, 1913.

5 SHEETS—SHEET 1.

Charles W. McWane, INVENTOR,

WITNESSES
Howard D. Orr
N. H. Riley

BY
E. G. Siggers
ATTORNEY

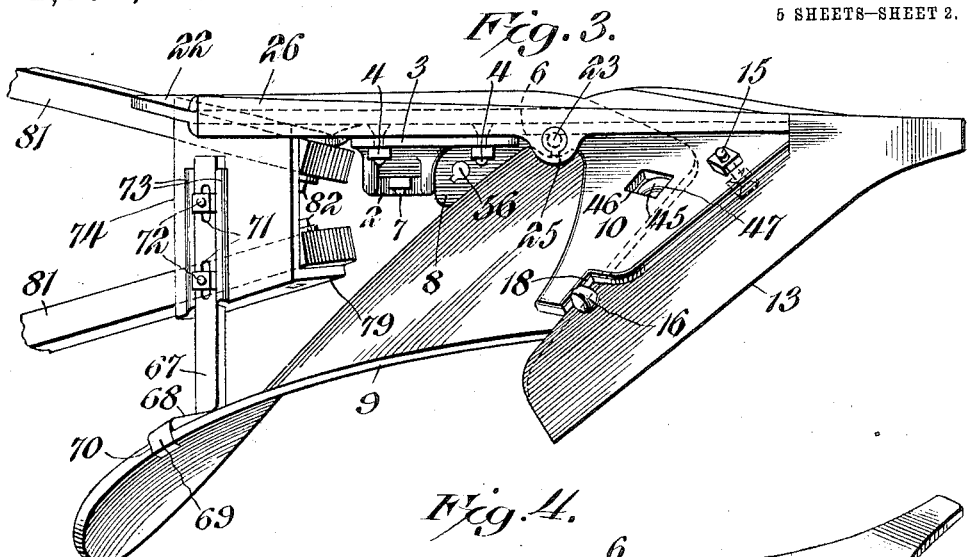
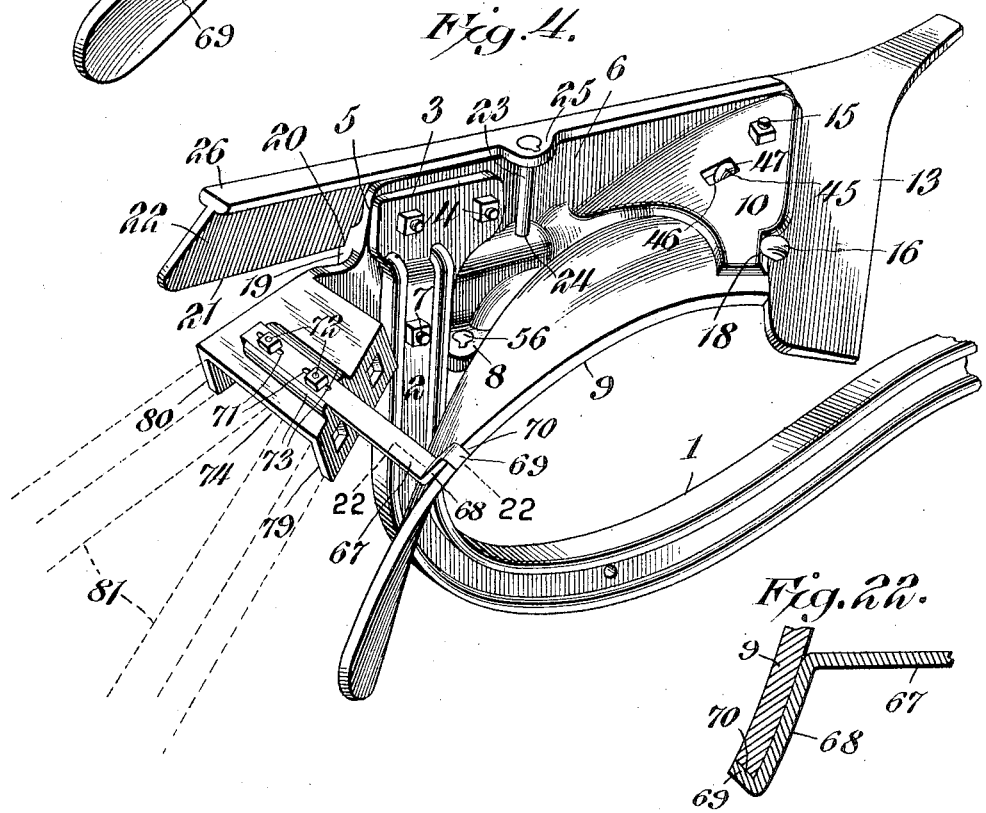

C. W. McWANE.
BOLTLESS MOLDBOARD AND LANDSIDE PLOW.
APPLICATION FILED JUNE 5, 1912.
1,076,507.
Patented Oct. 21, 1913.
5 SHEETS—SHEET 3.
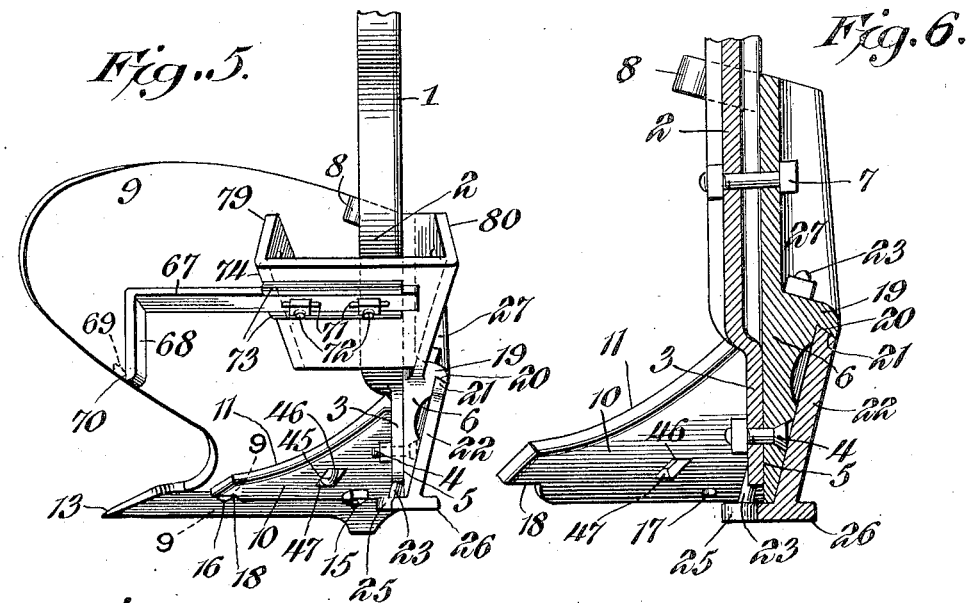
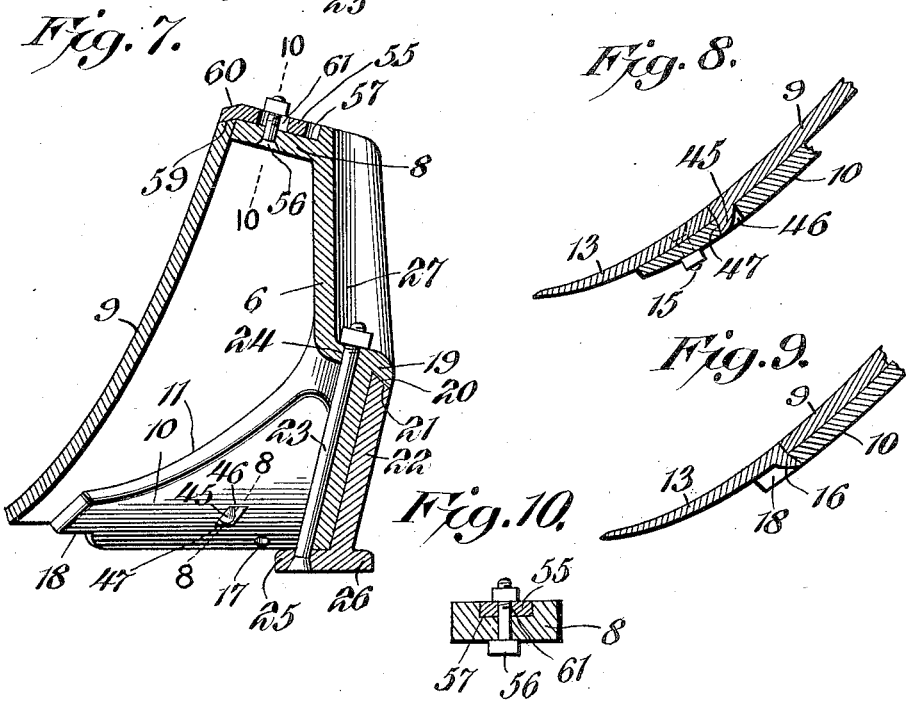
Charles W. McWane, INVENTOR,
WITNESSES
BY
ATTORNEY

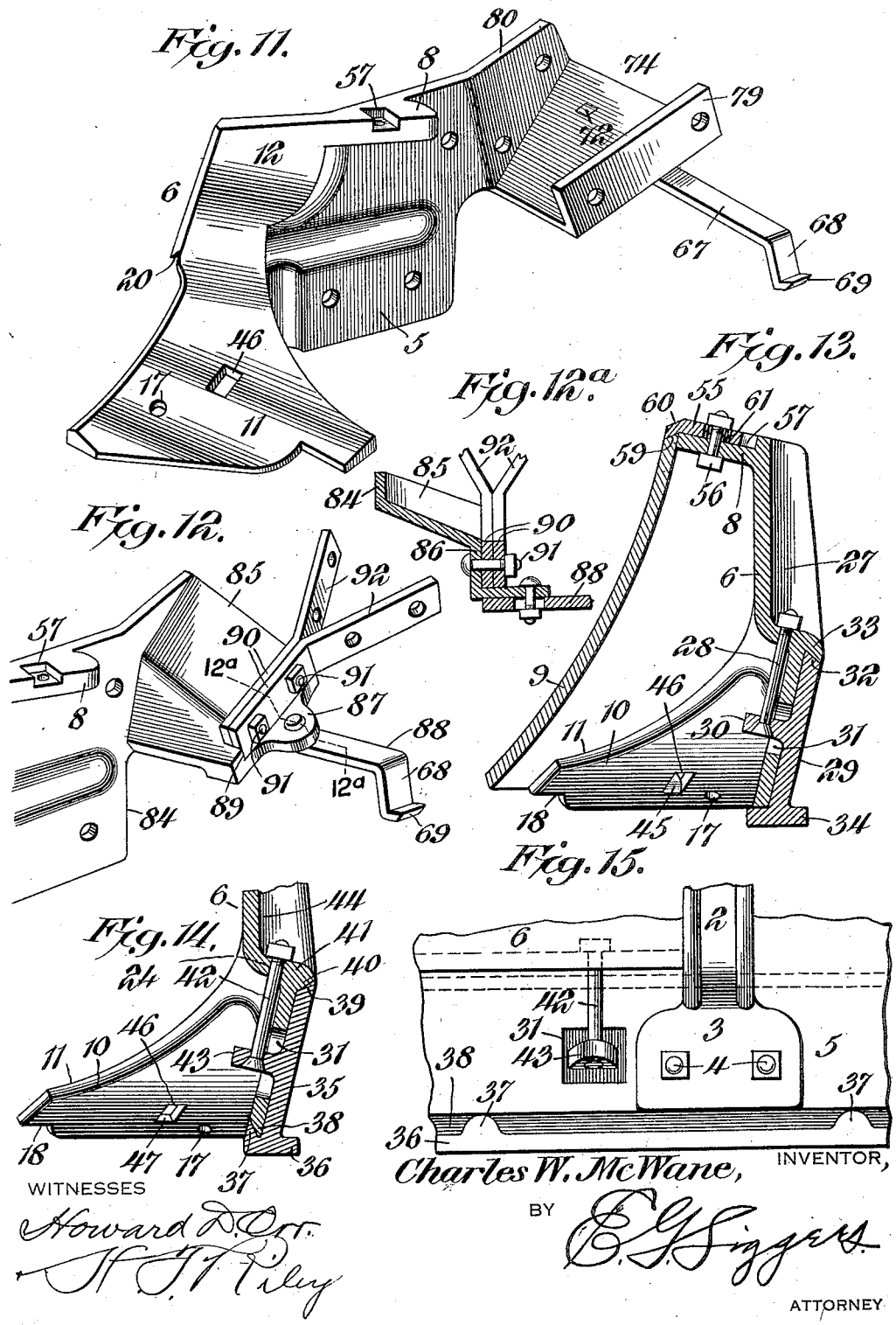

C. W. McWANE.
BOLTLESS MOLDBOARD AND LANDSIDE PLOW.
APPLICATION FILED JUNE 5, 1912.
1,076,507.
Patented Oct. 21, 1913.
5 SHEETS—SHEET 5.
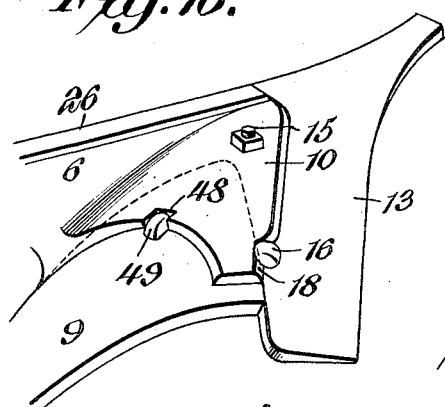
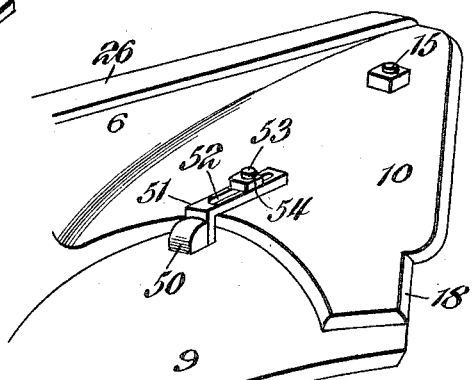
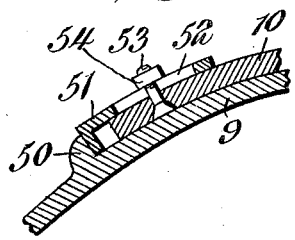
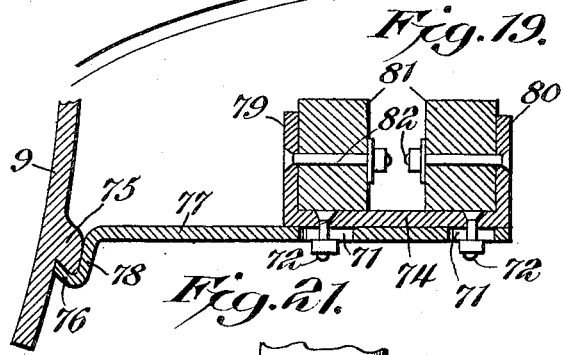
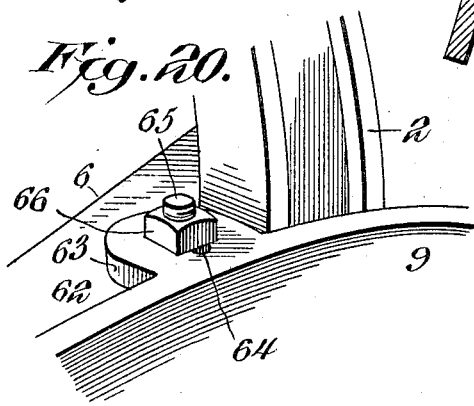
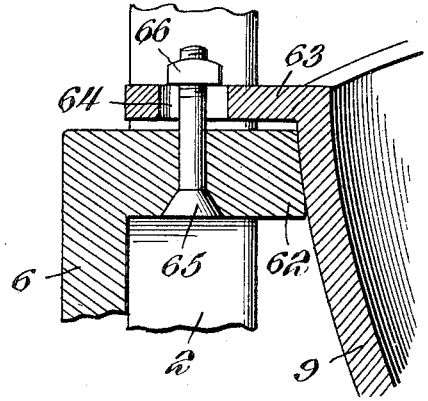
WITNESSES
Howard D. Orr.
H. F. Riley
Charles W. McWane, INVENTOR,
BY E. G. Siggers.
ATTORNEY

UNITED STATES PATENT OFFICE.

CHARLES WILLIAM McWANE, OF LYNCHBURG, VIRGINIA, ASSIGNOR TO LYNCHBURG FOUNDRY COMPANY, OF LYNCHBURG, VIRGINIA, A CORPORATION OF VIRGINIA.

BOLTLESS MOLDBOARD AND LANDSIDE PLOW.

1,076,507.  Specification of Letters Patent.  Patented Oct. 21, 1913.

Application filed June 5, 1912. Serial No. 701,849.

*To all whom it may concern:*

Be it known that I, CHARLES W. McWANE, a citizen of the United States, residing at Lynchburg, in the county of Campbell and State of Virginia, have invented a new and useful Boltless Moldboard and Landside Plow, of which the following is a specification.

The invention relates to a boltless moldboard and landside plow.

The object of the present invention is to improve the construction of plows, and to provide a simple, efficient and comparatively inexpensive plow of great strength and durability, equipped with a moldboard and a landside presenting imperforate or boltless surfaces to the soil, so that the wear on the moldboard and the landside incident to the frictional contact of those parts with the soil will not affect the fastening means for securing the moldboard and the landside to a plow.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
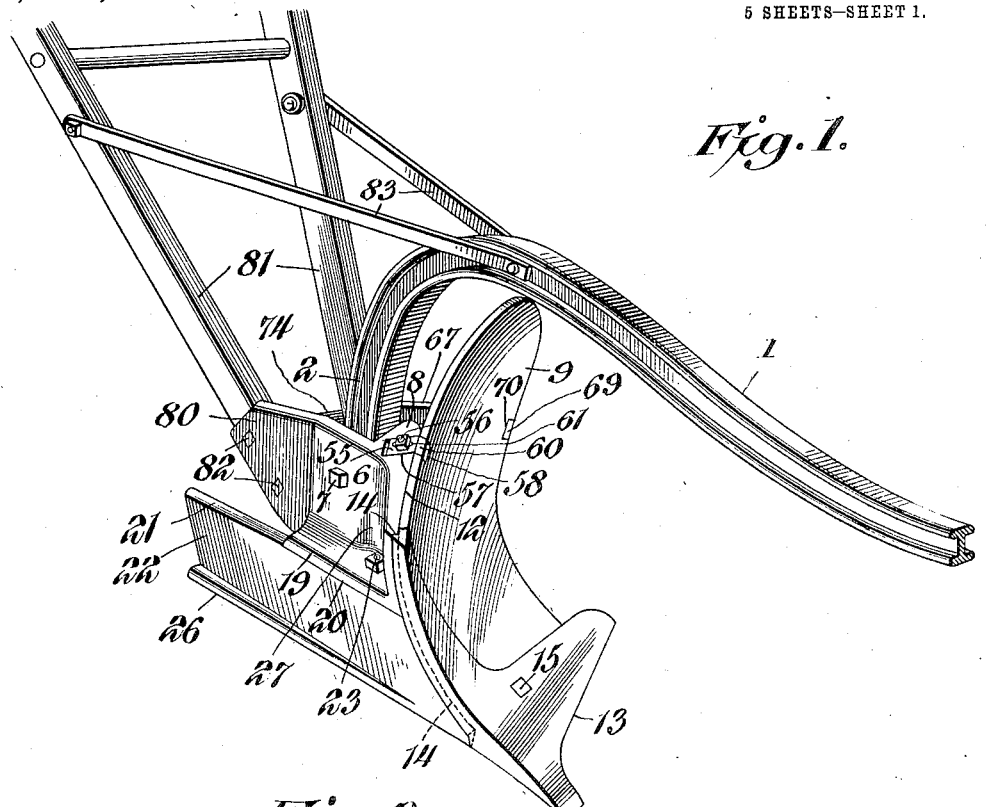
Figure 2:
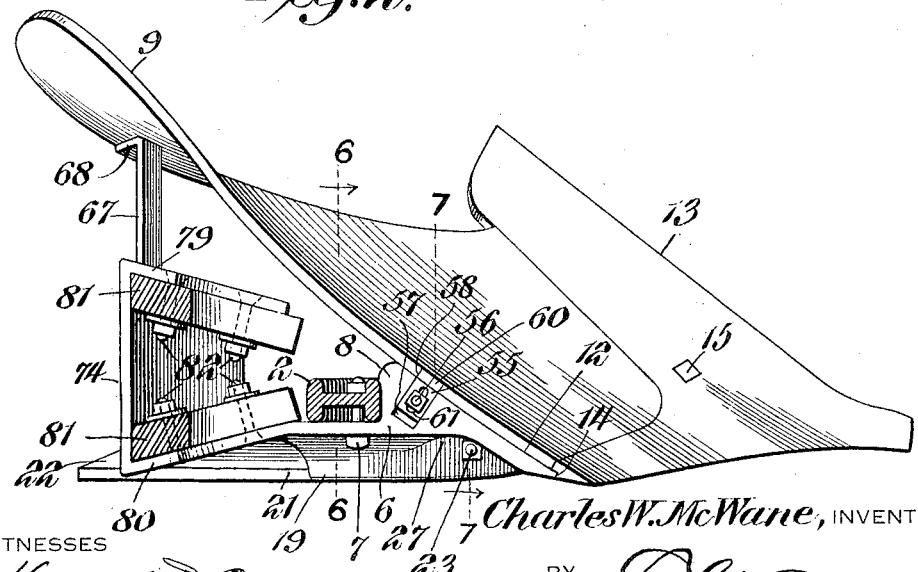

In the drawings:—Figure 1 is a perspective view of a boltless moldboard and landside plow, constructed in accordance with this invention. Fig. 2 is a plan view of the same, the handles and the beam being in section. Fig. 3 is a bottom plan view of the plow. Fig. 4 is a perspective view of the plow, showing the same inverted. Fig. 5 is a rear elevation of the plow. Fig. 6 is a vertical sectional view on the line 6—6 of Fig. 2. Fig. 7 is a similar view on the line 7—7 of Fig. 2. Fig. 8 is a detail sectional view on the line 8—8 of Fig. 7. Fig. 9 is a similar view on the line 9—9 of Fig. 5. Fig. 10 is a detail sectional view on the line 10—10 of Fig. 7. Fig. 11 is a detail perspective view of the standard. Fig. 12 is a detail perspective view, illustrating another form of the standard. Fig. 12$^a$ is a detail sectional view on the line 12$^a$—12$^a$ of Fig. 12. Fig. 13 is a transverse sectional view, illustrating another form of the means for securing the landside to the standard. Fig. 14 is a similar view, showing still another fastening means for the landside. Fig. 15 is a detail elevation of a portion of the landside and standard illustrated in Fig. 14. Fig. 16 is a detail perspective view illustrating another means for securing the front of the moldboard to the foot of the standard. Fig. 17 is a similar view, illustrating an adjustable means for fastening the front of the moldboard to the standard. Fig. 18 is a detail sectional view, taken longitudinally of the fastening means shown in Fig. 17. Fig. 19 is a transverse sectional view, illustrating another means for securing the adjustable spreader bar or brace to the rear portion of the moldboard. Fig. 20 is a detail perspective view, illustrating another means for securing the upper edge of the moldboard to the standard. Fig. 21 is a transverse sectional view of the fastening means illustrated in Fig. 20. Fig. 22 is a detail sectional view on the line 22—22 of Fig. 4.

Like numerals of reference designate corresponding parts in all the figures of the drawings.

In the accompanying drawings in which is illustrated the preferred embodiment of the invention, 1 designates a plow beam constructed of channeled metal, or other suitable material and having a downwardly extending rear portion 2, provided with an integral flattened terminal attaching portion 3, secured by bolts 4 to the lower portion of a flat inner face 5 of a standard 6. The plow beam is also secured to the upper portion of the standard by a bolt 7, piercing the beam at the web or connecting portion thereof. The rear portion of the beam is also arranged contiguous to a laterally extending lug 8 formed integral with the upper portion of the standard for the attachment of a moldboard 9, as hereinafter fully explained. By this construction and arrangement, the lower rear end of the plow beam is firmly and securely attached to the inner face of the standard 6.

The standard 6 is provided at its front with a lower integral foot 10, extending laterally from the inner side or face of the standard and having a concave front face 11, which merges into and forms a continuation of the front face 12 of the upper portion of the standard. The foot of the standard receives a plow point 13 recessed at its rear face to fit the front face of the foot and the standard and to provide a shoulder 14 for engaging the same and secured to the standard by a bolt 15 and a lug 16. The bolt 15 has its head countersunk in the plow point and arranged flush with the front face thereof, and the standard is provided with an opening 17 for the bolt 15, which is provided at the lower rear face of the foot of the standard with a nut. The lug 16, which is located at the rear edge of the lower laterally extending portion of the plow point, projects from the lower face of the same and engages beneath the front edge of the foot 10 in a recess 18 thereof. The lug and the bolt securely fasten the plow point to the standard in the usual manner. The standard is provided at its outer face with a horizontal longitudinal flange 19 having a beveled undercut lower face or edge 20 to engage a correspondingly beveled upper edge 21 of a landside 22. The beveled upper edge 21 of the landside is held in interlocked relation with the undercut flange 19 of the standard by a substantially vertical bolt 23, arranged at and fitted against the inner face of the lower portion of the standard and extending through a perforation 24 of the same adjacent to the flange 19 and also piercing an ear or lug 25, extending inwardly from a lower flange or enlargement 26 of the landside 22. The upper portion of the standard in rear of its front edge is extended inwardly and offset from the plane of the lower portion, and a recess 27 is thereby formed in the outer face of the said upper portion of the standard, as clearly illustrated in Fig. 7 of the drawings, and the bolt opening 24 is located in the bottom of the said recess 27. The head of the bolt 23 is preferably arranged at the lower end thereof and is countersunk in the lug or ear 25 while the nut of the bolt is arranged within the recess 27 at the bottom thereof and ready access may be had to the same. By this construction, the bolt 23 is not exposed at the outer side face of the landside, which is imperforate. Also this construction enables the landside to be securely fastened to the standard by a single bolt. The outer face of the lower portion of the standard is arranged at a slight inclination and the landside is also slightly inclined, as clearly shown in Figs. 6 and 7 of the drawings. The front edge of the landside extends to the front edge of the standard and fits against the shoulder 14 of the plow point.

The means for attaching the landside to the standard is susceptible to a variety of modifications, several of which are illustrated in the accompanying drawings. In Fig. 13 a relatively short substantially vertical bolt 28 is employed, and to enable this result to be accomplished the landside 29 is provided at an intermediate point between its upper and lower edges with an inwardly projecting integral lug or ear 30, extending through an opening 31 in the lower portion of the standard to the inner face thereof. The head of the bolt 28 is countersunk in the lower face of the lug or ear 30, and the nut of the bolt is arranged at the upper end thereof similar to that of the bolt 23. The upper edge 32 of the landside 29 is interlocked with an undercut flange 33 of the standard in the manner heretofore described and the landside is provided at its lower edge with a flange or enlargement 34, which extends beneath the lower edge of the standard.

In Figs. 14 and 15 of the drawings, the landside 35 is provided at its bottom with a flange or enlargement 36 having tapered lugs 37, projecting from its upper face and presenting inner inclined faces arranged at an acute angle to the inner face of the landside and forming tapering grooves or recesses to receive the lower edge 38 of the standard, which is beveled to interlock with the said grooves or recesses. The upper edge 39 of the landside is beveled upwardly and outwardly from the inner face and is fitted against a correspondingly beveled lower edge 40 of a horizontal longitudinal flange 41. The landside is also secured to the standard by a short approximately vertical bolt 42, arranged similar to the short bolt 28, shown in Fig. 13 of the drawings. The bolt 42 pierces an intermediate lug 43 of the landside, and it extends upwardly from the said lug 43 and pierces the standard at the bottom of the recess 44.

The moldboard 9, which is imperforate and boltless, is fitted against the concave front face of the standard and the foot thereof, and its curvature conforms to the configuration of the said faces of the standard. The lower and front edges of the moldboard fit against the contiguous edges of the plow point, which forms an abutment for and supports the moldboard, as clearly illustrated in Figs. 1 and 2 of the drawings, and in order to prevent the moldboard from dropping when the plow point is detached, and also hold the moldboard from upward or outward movement when the plow is in actual operation the moldboard is provided at its lower edge with an integral projecting lug 45, extending downwardly into an opening or recess 46 in the foot of the standard and having a slightly inclined front edge, which engages and interlocks with a correspondingly inclined or undercut front wall or shoulder 47 of the opening 46. This construction enables the plow point to be readily detached without liability of the moldboard dropping from its proper position on the standard.

It is obvious that instead of making a complete hole or opening in the foot, a recess may be formed of sufficient depth to accommodate the lug and would provide an equivalent construction. In the claims I use the term "socket" to cover either a hole or recess, while the term "shoulder" is designed to embrace any form of abutment or stop provided on the foot of the standard against which the lug on the moldboard is adapted to bear.

The lug, which constitutes the front attaching means for the moldboard, is also susceptible of a variety of modifications. In Fig. 16 of the drawings, the foot of the standard is provided at its rear edge with a recess 48 and the front wall or shoulder thereof is engaged by a lug 49, formed integral with the lower or rear face of the moldboard and located at a point in rear of the front edge thereof.

In Figs. 17 and 18 is illustrated an adjustable connection between the foot of the standard and a lug 50 of the moldboard. The lug 50, which is formed integral with the moldboard, is spaced from the rear edge of the foot of the standard and is engaged by a plate or member 51 adjustably mounted on the lower face of the foot of the standard. The plate or member 51 is approximately L-shaped and is provided with a longitudinal slot 52 through which passes a bolt 53, which also pierces the foot of the standard. The nut 54 of the bolt engages the plate or member 51 and the rear portion of the latter fits against the lug 51. By means of this adjustable connection, any looseness of the moldboard may be readily taken up and the moldboard may be maintained firmly in its position against the standard.

The moldboard, which is fitted at its upper edge against the laterally projecting lug or portion 8 of the standard, is held against upward movement by a cap plate 55, secured by a bolt 56 in a recess 57 in the upper face of the said laterally projecting lug or portion 8. The laterally projecting portion 8 is located at the upper edge of the standard and extends from the inner face of the same, and the moldboard is provided in its upper edge with a notch or recess 58, registering with the recess of the lug 8 and receiving the front or outer portion of the cap plate 55. The bottom 59 of the notch or recess is downwardly and outwardly inclined or beveled, and the outer portion 60 of the cap plate is set at a corresponding inclination to engage or interlock with the notch of the upper edge of the moldboard. The inclined outer portion of the cap plate holds the moldboard against upward movement and also prevents the same from slipping forwardly or outwardly from beneath it. The bolt 56 pierces the laterally projecting lug or portion 8 and extends through a slot 61 in the cap plate, and it is located in rear of and is not exposed on the face of the moldboard, which is imperforate or boltless. Also by this construction the moldboard is secured to the standard by a single bolt, which is readily accessible.

The top fastening means for the moldboard may be modified in various ways, and in Figs. 20 and 21 of the drawings, the standard is provided at the top with a laterally extending lug or projection 62 fitting against the rear face of the moldboard, which is provided with an integral ear or lug 63, provided with a slot 64 receiving a bolt 65, which also pierces the laterally extending lug or portion 62. The lug or ear 63 is engaged by the nut 66 of the bolt 65, and the slot 64 provides for an adjustment of the moldboard.

The moldboard is engaged and secured at its heel by a transversely disposed spreader bar 67, provided with a downwardly and rearwardly extending arm 68, arranged at an inclination and having an outwardly extending terminal engaging portion 69, which fits in a notch or recess 70 in the rear edge of the moldboard. The terminal engaging portion 69 is set at an acute angle to the arm of the spreader bar, and the coacting inner wall of the notch or recess 70 is beveled to arrange it at an angle to correspond with the said terminal engaging portion to form an interlocking connection between the heel of the moldboard and the spreader bar. The inner portion of the spreader bar is provided with longitudinal slots 71, and it is slidably secured by bolts 72 in a guide formed by parallel ribs 73 of a lateral extension 74 of the standard. The ribs brace and support the spreader bar, and the bolts. which pierce the lateral extension, are provided at their rear ends with nuts for engaging the spreader bar.

The spreader bar, which firmly braces the heel of the moldboard, may be connected with the same in various ways, and in Fig. 19 of the accompanying drawings, the moldboard is provided at its rear face with an integral lug 75, having a beveled rear face to interlock with an angularly disposed terminal engaging portion 76 of a spreader bar 77. The rearwardly extending arm 78 of the spreader bar fits against the lug 75 and corresponds in length to the size of the same. The outer end of the spreader bar may be interlocked or secured to the moldboard in any other suitable manner. The lateral extension 74, which is set at an inclination, is tapered downwardly and is located at the upper portion of the standard and is provided at its outer edge with an attaching flange 79, extending forwardly from the lateral extension and arranged at an acute angle to the front face of the same and in spaced relation with the inner face of the standard. The rear upper portion 80 of the standard is arranged at a slight angle to the intermediate portion of the same, as clearly illustrated in Fig. 2 of the drawings, and the attaching flange 79 and the angularly disposed rear portion 80 of the standard converge and coöperate with the lateral extension to form a cuff for the lower ends of plow handles 81. The plow handles 81 are secured within the cuff to the inner faces of the flange 79 and the angularly disposed portion 80 by bolts 82, or other suitable fastening means. The cuff is open at the front and it obviates the necessity of securing them to the moldboard. The plow handles 81 are connected with the beam 1 by forwardly converging braces 83, consisting of metallic bars and bolted at their rear ends to the outer faces of the plow handles and secured at their front ends to the beam 1 in the channels or grooves thereof.

In Figs. 12 and 12ª of the drawings, is illustrated another means for connecting the plow handles with the standard. The standard 84 is provided at its rear end with a lateral extension 85, having an attaching flange 86, extending rearwardly from the lateral extension and provided at its outer edge with an integral lug or ear 87 to which the spreader bar 88 is secured. The flange 86 is approximately L-shaped in cross section, and it is provided in its lower end with a shoulder 89, forming a stop for a pair of metallic connecting bars 90, which are secured by bolts 91, or other suitable fastening devices to the attaching flange. The connecting bars, which are arranged at an inclination, have their lower portions fitted together and provided with registering perforations for the bolts 91, and the upper portions 92 of the connecting bars are bent at an angle and diverge upwardly and rearwardly and are provided with perforations to receive bolts for securing a pair of plow handles to the said diverging portions of the connecting bars. The spreader bar 88 has an outer portion of the same construction as the spreader bar 67, and it is adapted to brace and support the heel of the moldboard.

It will be observed that there are three connections between the standard and the moldboard, viz: one between the foot of the standard and the moldboard consisting of a lug 45 on the moldboard which interlocks with an opening 46 or shoulder provided on the standard; another between the standard and the moldboard at the top consisting of a substantially vertical bolt 56 connecting a lug on the standard with a cap piece that engages the upper edge of the moldboard; and the third connection between the standard and the heel portion of the moldboard consisting of a spreader bar having a terminal engaging portion fitting in a notch of said heel portion of the moldboard. While all three connections are desirable to make a perfect implement, two only are essential. First, the interlocking connection at the bottom between the moldboard and the standard, which interlocking connection has no positive fastening means, and, second, a connection between the standard and the moldboard above said interlocking connection, the last-mentioned connection including a fastening bolt which serves to retain the interlocking connection in engagement. The exact location of the second connection is not material. It may be either at the top or at the heel of the moldboard, but it must be above or at one side of the plane of the interlocking connection.

There is a direct coaction between the connection of the spreader bar with the heel of the moldboard and the front interlocking connection between the moldboard and the standard. It will be noted that the spreader bar engages the curved edge of the moldboard at a point above the said front connection. The moldboard is thus engaged with the standard at the bottom and engaged by the spreader bar at the heel. These two connections serve to prevent the moldboard from slipping forwardly.

What is claimed is:—

1. In a plow, the combination of a standard, a landside fitted against the outer face of the standard and detachably interlocked at one of its longitudinal edges with the same, said landside being provided with an integral lug or ear located at the inner face of the standard, and a substantially vertical bolt also located at the inner face of the standard and connected with the same and with the lug.

2. In a plow, the combination of a standard provided at its outer side with an undercut longitudinal flange, a landside fitted against the standard and having its upper edge detachably interlocked with the undercut flange, said landside being provided with an inwardly extending lug, and a substantially vertical bolt located at the inner face of the standard and connected with the same and with the lug.

3. In a plow, the combination of a standard provided with a longitudinal undercut flange, a landside fitted against the standard and having its upper edge engaged with the said flange and provided at its lower edge with an inwardly projecting lug or ear, and a substantially vertical bolt located at the inner face of the standard and piercing the said lug or ear and connecting the same with the standard.

4. In a plow, the combination of a standard having a longitudinal flange at its outer side and provided above the flange with a recess, a landside arranged against the standard and having its upper edge fitted against the said flange, said landside being provided with an inwardly extending lug, and a substantially vertical bolt piercing the lug and extending through the standard at the bottom of the said recess.

5. In a plow, the combination of a standard, a landside fitted against the outer face of the standard and detachably interlocked at one of its longitudinal edges with the said standard, and a substantially vertical bolt piercing the standard and arranged at the inner side thereof and connected with the landside and maintaining the same in its interlocked relation with the standard.

6. In a plow, the combination of a standard, a landside fitted against the outer face of the lower portion of the standard, and a substantially vertical bolt connecting the landside and standard and arranged at the inner side of the same, the upper portion of the standard directly above the landside being offset from the vertical plane of the lower portion so as to provide a recess through the bottom of which the end of the bolt passes.

7. In a plow, the combination of a standard having a shoulder, an imperforate moldboard provided at its lower front portion with an integral lug arranged to rest against the shoulder of the standard to prevent the moldboard from dropping, and separate means provided between the standard and the moldboard remote from the said lug and shoulder for connecting said parts, said connecting means serving to maintain the lug in contact with the shoulder without actual fastening means at that point.

8. In a plow the combination of a standard provided near the bottom with an opening, and an imperforate moldboard fitted against the standard and provided at its rear face near the bottom with an integral lug projecting into said opening, said lug having its front edge undercut and engaging the front wall of said opening, whereby the moldboard is prevented from dropping when the plow point is removed and is held from outward movement at the bottom when the plow is in use, and means for maintaining the lug in such engagement.

9. In a plow, the combination of a standard provided with a socket, and an imperforate moldboard fitted against the said standard and provided at its rear face with an integral lug projecting into said socket, and fastening means for the moldboard at the top, said fastening means including a substantially vertically-disposed bolt which connects elements between the standard and the moldboard.

10. In a plow, the combination of a standard provided with a socket, an imperforate moldboard fitted against the said standard and provided at its rear face with an integral lug projecting into said socket and having an interlocking engagement therewith, whereby the moldboard is held from dropping when the plow point is removed and is prevented from moving outwardly at the bottom when the plow is in use, and fastening means for the moldboard at the top, said fastening means serving to prevent the moldboard from moving upwardly and slipping forwardly or outwardly at the top.

11. The combination of a standard having a socket, an imperforate moldboard fitted against the standard and provided at its rear face with an integral lug formed with a flat front face and a curved rear face to permit the lug to slip into and out of the socket, and separate means remote from the said lug and socket for connecting the standard and moldboard and serving to maintain the said lug in contact with the front wall of the socket without actual fastening means at that point.

12. The combination of a standard having a shoulder, an imperforate moldboard fitted against the standard and provided at its rear face with an integral lug resting against the shoulder, and a fastening bolt between the moldboard and the standard at the top above the lug and shoulder and serving to hold the lug firmly in contact with the shoulder.

13. In a plow, the combination of a standard provided at the top with a laterally projecting lug or portion, a moldboard fitting against the laterally projecting lug or portion, a vertically disposed bolt, and means fitted against the upper face of the laterally projecting lug or portion of the standard and engaged by the said bolt for securing the moldboard to the said lug or portion.

14. In a plow, the combination of a standard, a moldboard, a substantially vertically-disposed bolt arranged in rear of the moldboard at the top, and means provided on the standard and moldboard and to which said bolt is rigidly connected for fastening the moldboard to the standard without perforating the moldboard.

15. In a plow, the combination of a standard, a moldboard, a substantially vertically-disposed bolt arranged in rear of the moldboard at the top, and co-acting means provided between the standard and moldboard and mounted on the bolt for rigidly connecting the moldboard with the standard without perforating the moldboard, said means allowing for the forward and backward adjustment of the moldboard.

16. In a plow, the combination of a standard, a moldboard fitted against the standard, a substantially vertically-disposed bolt, and a cap plate arranged in a plane substantially at right angles to the standard and the moldboard and detachably secured to the standard by the said bolt, said cap plate projecting over the moldboard and engaging the same at the upper edge thereof for holding the moldboard against upward movement.

17. In a plow, the combination of a standard, a moldboard fitted against the standard and provided at its upper edge with a recess, and a cap plate arranged in a plane substantially at right angles to the standard and the mold board and detachably secured to the standard and projecting over the moldboard and fitting in and engaging the recess thereof.

18. In a plow, the combination of a standard provided at the top with a laterally projecting lug or portion having a recess in its upper face, a moldboard fitted against the standard and provided in its upper edge with a recess registering with the said recess, and a cap plate secured in the recess of the laterally projecting lug or portion and extending over the moldboard and engaging with the recess thereof for holding the moldboard against upward movement.

19. In a plow, the combination of a standard provided at the top with a laterally projecting lug or portion, a moldboard fitted against the standard, and a cap plate arranged in a plane substantially at right angles to the standard and the moldboard and secured upon the laterally projecting portion or lug and extending over and engaging the moldboard at the upper edge thereof for holding the moldboard against upward movement.

20. In a plow, the combination of a standard, a moldboard fitted against the standard and provided at its upper edge with a downwardly and forwardly inclined face, and a cap plate arranged in a plane substantially at right angles to the standard and the moldboard and secured to the standard and having an inclined outer portion extending over the moldboard at the upper edge and engaging the said inclined face of the moldboard.

21. In a plow, the combination of a standard having a foot provided with a shoulder, an imperforate moldboard fitted against the standard and having at its lower portion an integral lug engaging the shoulder to prevent the moldboard from dropping, and means extending rearwardly from the moldboard at the upper edge thereof and detachably secured to the standard for holding the said moldboard against upward movement.

22. In a plow, the combination of a standard provided at its upper portion with a laterally extending lug and having a foot at its lower portion, a moldboard fitted against the standard and provided with an integral lug engaging with the foot of the standard and arranged to prevent the moldboard from dropping, and a cap plate secured to the lug of the standard and projecting over the moldboard and engaging the same at the upper edge thereof to prevent the moldboard from moving upwardly.

23. In a plow, the combination of a moldboard, and a transverse spreader bar rigidly secured to the standard of the plow and having an outer arm fitted against the moldboard at the rear face thereof and detachably interlocked with the edge of said moldboard at the heel portion.

24. A plow including a moldboard provided at its heel with a recess formed in its edge, and a transverse spreader bar arranged across the rear of the plow and having a terminal engaging portion fitted in the recess and detachably interlocked with the heel of the moldboard.

25. A plow including a standard, a moldboard, and a spreader bar arranged transversely across the rear of the plow and connected at one end with the standard and provided at the other end with an angularly disposed arm fitted flat against the rear face of the moldboard at the heel and having its terminal bent forwardly and interlocked with the edge of the moldboard.

26. In a plow, the combination of a standard provided at the back with a lateral extension, a moldboard secured to the standard, and a transversely disposed spreader bar connected at one end to the lateral extension and extending therefrom to the heel of the moldboard and having an outer terminal portion interlocked with the outer edge of said moldboard.

27. In a plow, the combination of a standard, an imperforate moldboard, a connection between the standard and the rear face of the moldboard at the bottom, a second connection between the standard and the rear of the moldboard at the top, and a third connection between the standard and the moldboard at the heel portion of the latter, said connections serving to hold the moldboard to the standard without perforating the former.

28. In a plow, the combination of a standard, an imperforate moldboard, a connection between the standard and the rear face of the moldboard at the bottom, a second connection between the standard and the rear of the moldboard at the top, and a third connection between the standard and the moldboard at the heel portion of the latter, said connections serving to hold the moldboard to the standard without perforating the former and the second connection including a bolt and nut, which serves to retain the other connections in engagement.

29. In a plow, the combination of a standard, an imperforate moldboard, and three connections between the moldboard and the standard, two of the connections being interlocking connections without fastening means and the third connection including a fastening bolt, which retains the other two connections in interlocked relation.

30. In a plow, the combination of a standard having a laterally extending lug at its upper portion and provided at its lower portion with a foot having a shoulder, a moldboard fitted against the standard and provided with an integral lug resting against the said shoulder and arranged to prevent the moldboard from dropping when the point of the plow is removed, and a cap plate arranged in a plane approximately at right angles to the standard and the moldboard and secured to the standard and projecting over and engaging the moldboard at the upper edge thereof to prevent the moldboard from moving rearwardly.

31. In a plow, the combination of a standard, an imperforate moldboard, a connection between the moldboard and the standard at the bottom, said connection being an interlocking connection without fastening means, and a second connection between the standard and the moldboard above the first-named connection, said second connection including a fastening bolt which retains the first-mentioned connection in interlocked engagement.

32. In a plow, the combination of a standard having a shoulder, an imperforate moldboard provided at its lower front portion with an integral lug arranged to rest against the shoulder of the standard to prevent the moldboard from dropping when the plow point is removed or moving upwardly when the plow is in use, and separate means provided between the standard and the moldboard above said lug and shoulder for connecting the standard and the moldboard, said connecting means including a bolt which is adapted to hold the lug in contact with the shoulder.

33. In a plow, the combination of a standard provided with a socket, an imperforate moldboard fitted against the said standard and provide at its rear face with an integral lug projecting into said socket, and fastening means for the moldboard above the said lug and socket, said fastening means including a bolt arranged in rear of the moldboard and connecting the standard and moldboard without perforating the latter.

34. In a plow, the combination of a standard, a moldboard having a recess in its edge at the heel thereof, and a spreader bar arranged transversely across the rear of the plow and rigidly connected at one end with the standard and provided at the other end with an arm resting flat against the rear face of the moldboard at the heel, said arm being provided with a terminal engaging portion arranged at an angle to said arm and fitting flush within the said recess of the moldboard.

35. In a plow, the combination of a standard, an imperforate moldboard, a connection between the moldboard and the standard at the bottom, said connection being an interlocking connection without fastening means, and a second connection between the standard and the moldboard, said second connection being arranged above and in rear of the first-named connection and bearing against the moldboard at the rear thereof.

36. In a plow, the combination of a standard having a foot provided with a shoulder, an imperforate moldboard fitted against the standard and provided at its lower front portion with an integral lug arranged to rest against said shoulder, and separate means provided between the moldboard and standard for connecting said parts without perforating the moldboard, said connecting means serving to maintain the lug in contact with said shoulder without actual fastening means at that point.

37. In a plow, the combination of a standard, an imperforate moldboard, a connection between the moldboard and the standard at the bottom, said connection being an interlocking connection without fastening means, and a second connection between the standard and the moldboard, said second connection being arranged above and in rear of the first-named connection and serving to rigidly connect the moldboard to the standard without perforating the moldboard.

38. In a plow, the combination of a standard, an imperforate moldboard, a connection between the moldboard and the standard, said connection being an interlocking connection without fastening means which is disconnected by an upward and outward movement of the moldboard, and a second connection between the moldboard and the standard, said second connection being arranged above and in rear of the first-named connection and remote from the same and serving to rigidly connect the moldboard to the standard without perforating the moldboard.

In testimony that I claim the foregoing as my own I have hereto affixed my signature in the presence of two witnesses.

CHARLES WILLIAM McWANE.

Witnesses:
W. W. COFFEY,
G. R. JOHNSON.